Nov. 12, 1957 J. T. TIMMS 2,812,638
ROTARY, HYDRAULIC PUMP AND MOTOR TRANSMISSION
Filed May 2, 1955 5 Sheets-Sheet 3
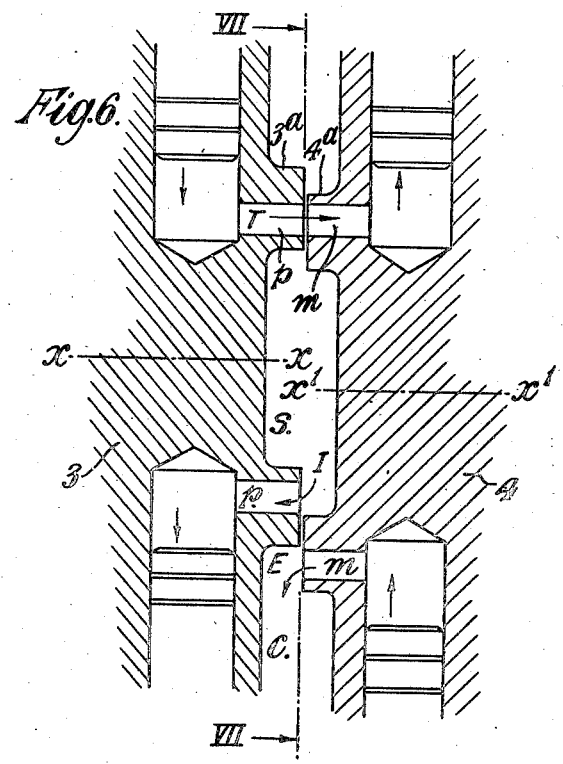
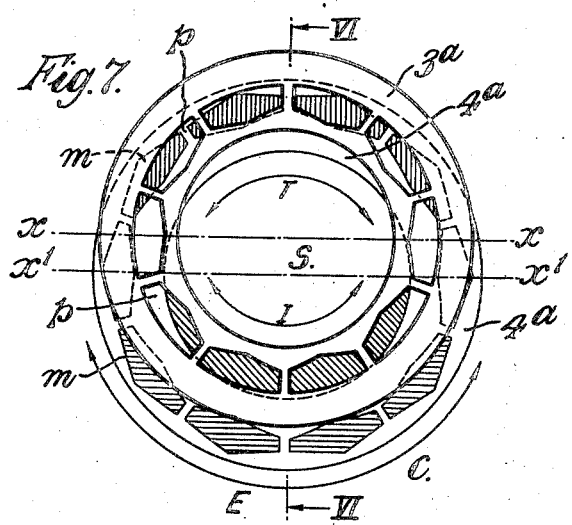
INVENTOR:
JACK T. TIMMS
BY: Francis E Boyce
ATTORNEY Nov. 12, 1957 J. T. TIMMS 2,812,638
ROTARY, HYDRAULIC PUMP AND MOTOR TRANSMISSION
Filed May 2, 1955 5 Sheets-Sheet 4

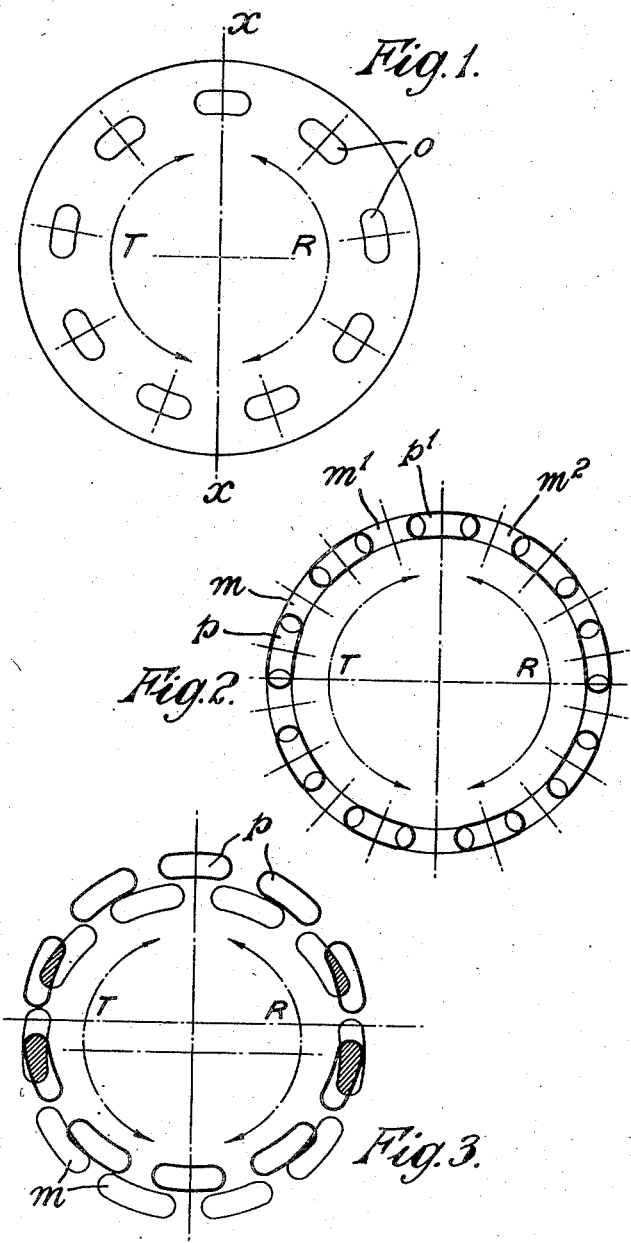

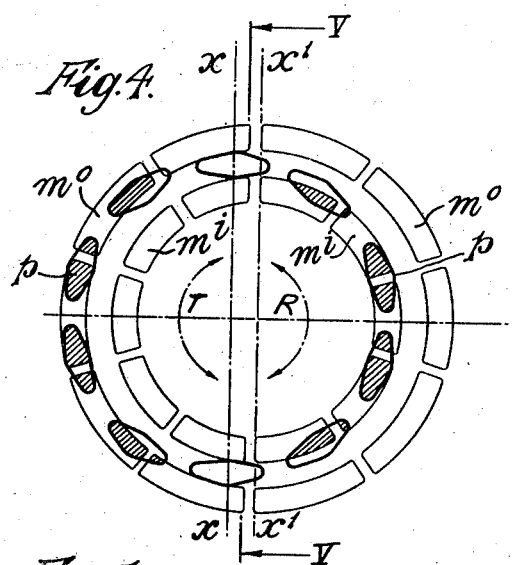
Fig. 4.
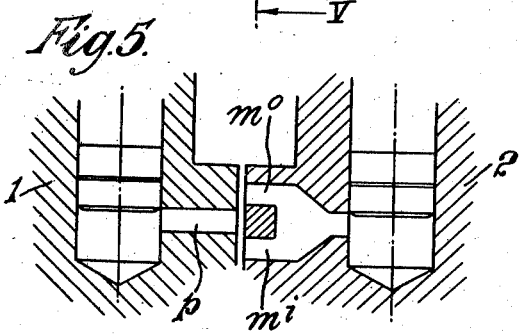
Fig. 5.
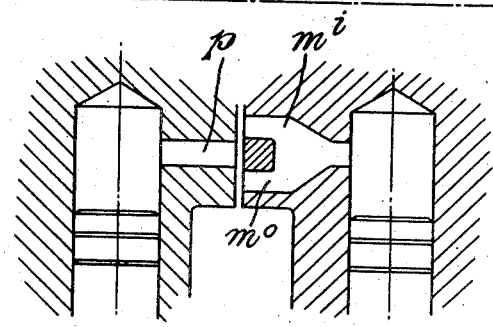

INVENTOR:
JACK T. TIMMS
BY: Francis C Boyce
ATTORNEY

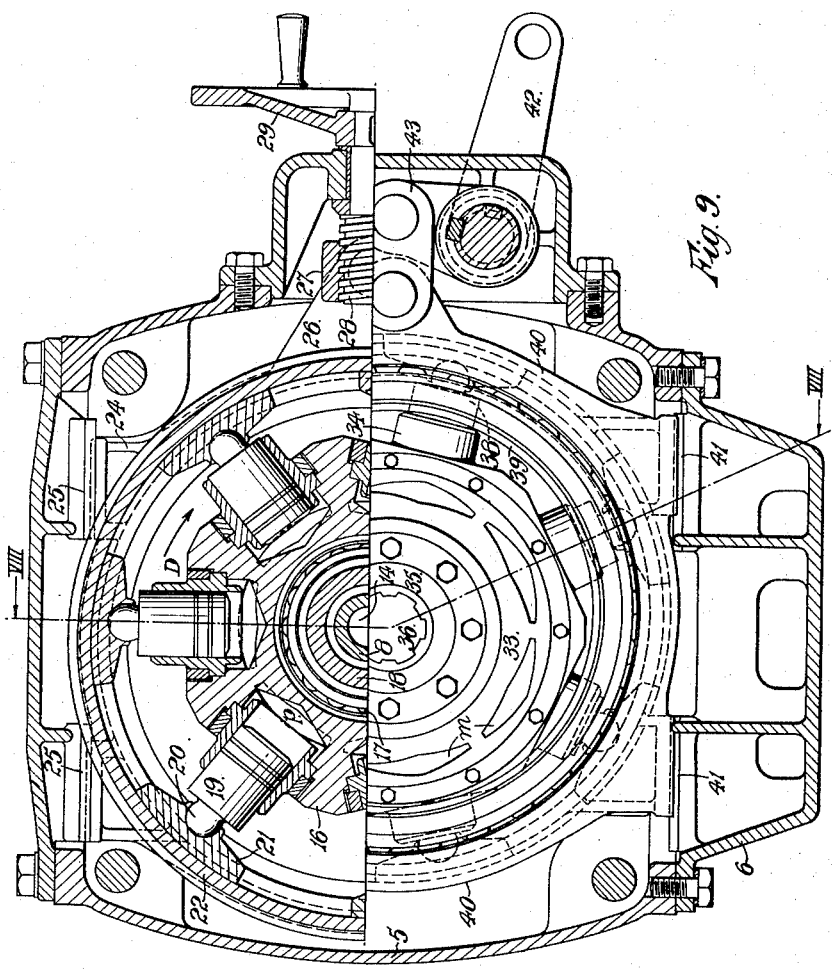

United States Patent Office

2,812,638
Patented Nov. 12, 1957

2,812,638

ROTARY, HYDRAULIC PUMP AND MOTOR TRANSMISSION

Jack Thomas Timms, Newcastle upon Tyne, England, assignor to George Angus & Company Limited, Newcastle upon Tyne, England Application May 2, 1955, Serial No. 505,427

Claims priority, application Great Britain May 4, 1954

13 Claims. (Cl. 60—53)

This invention relates to hydraulic transmission for conveying continuous rotary motion and is applied to such apparatus of the kind comprising a pump and motor combination. The pump is a rotary pump hydraulically coupled to a rotary motor, the pump and motor each having, for example, a rotary, multi-cylinder block or barrel with ports for delivery, by piston displacement, of the hydraulic liquid under pressure from the pump to the motor. The arrangement of the cylinders is usually either parallel with or radial to the axis of rotation and change of speed or ratio of transmission may be obtained by controlling the stroke of the pump or motor pistons.

The invention is also applicable to other kinds of hydraulic power transmission apparatus comprising pump and motor combinations in which the hydraulic liquid is subjected to cyclical positive displacement through ports. One example of such another kind of apparatus is a vane pump and motor each having an eccentric rotor and stator combination with radially sliding vanes successively sweeping a working space between the rotor and stator.

However, for convenience, the invention will be described as applied to multiple cylinder and piston apparatus.

The power transmission efficiency of apparatus of the above-indicated, pump and motor, kind is relatively low. A considerable proportion of power loss is due to pipe friction in the liquid passages between the pump and the motor and to mechanical loss and leakage in the valving arrangements which regulate liquid flow through such passages, involving, for example, rotation of a cylinder block face against a stationary valve plate.

The object of the present invention is to provide a means of improving efficiency in and simplifying hydraulic transmission by eliminating stationary valve members and shortening substantially the liquid passages between pump and motor components.

For the above purpose, in a hydraulic, pump and motor combination, rotary power transmission apparatus, comprising a rotary pump body having a port member with ports for delivery of liquid under pressure to ports in a corresponding port member of a rotary motor body to be driven by the liquid under pressure; according to the invention the port members are directly opposed in mutual contact and the pump ports and motor ports respectively have different rotational paths which overlap in one sector of the mutual contact area of the port members for delivery of liquid from pump ports to motor ports.

By placing the port members in mutual contact and having different but overlapping rotational paths for the ports, the surface of one port member acts as a valve for the ports of the other port member and thus the need for an intervening valve plate or the like is obviated. The preferred method of obtaining the different rotational paths for the ports is to offset the pump and motor axes.

The invention will now be described in principle, and in one constructional embodiment by way of example, with reference to the accompanying drawings, in which:

Figs. 1, 2, 3 and 4 are diagrams of the cylinder ports of multi-cylinder blocks.

Fig. 5 is a diagrammatic axial section, on the line V—V of Fig. 4, through the mutually contacting port member parts of pump and motor cylinder blocks of a radial cylinder hydraulic transmission according to the invention.

Fig. 7 is a transverse sectional diagram of the faces of the contacting port members of the open-circuit arrangement of Fig. 6, on the line VII—VII of Fig. 6.

Fig. 8 is a view of a variable speed transmission shown in longitudinal section above the rotational axes and side elevation, inside the case, below the axes except at the center where the contacting port members are shown in cross section on the line VIII—VIII of Fig. 9, and Fig. 9 is a transverse sectional and elevational view on the line IX—IX of Fig. 8.

Figure 6:
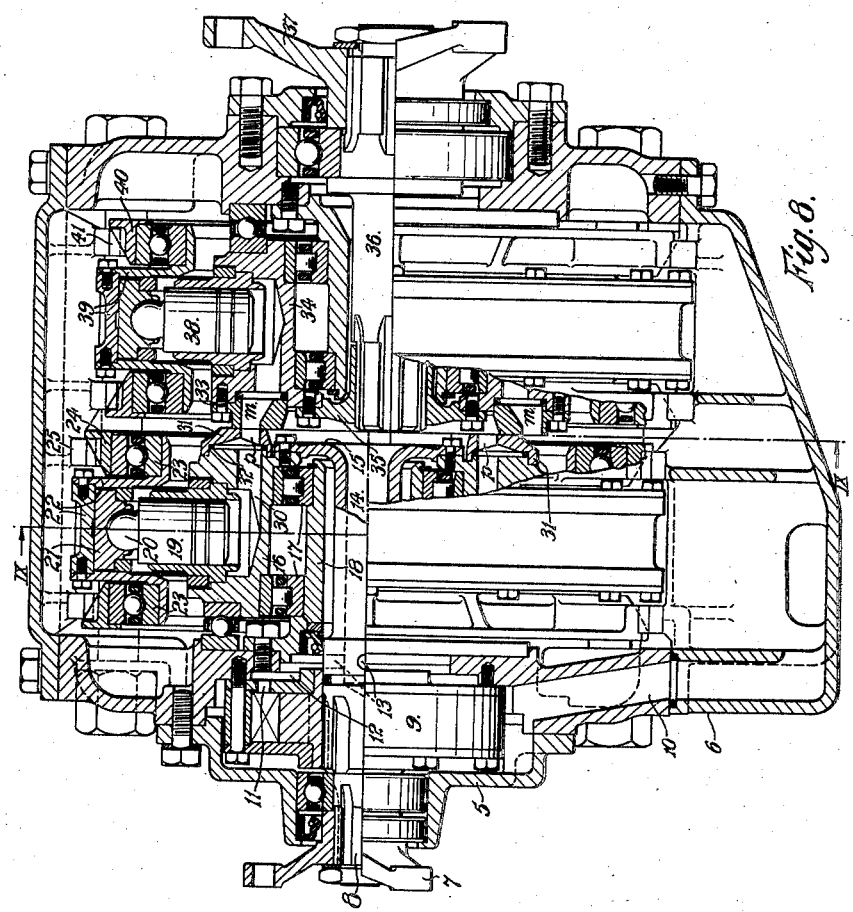
Fig. 6 is a diagrammatic axial section, similar to Fig. 5, of a pump and motor arrangement for open-circuit operation and corresponding approximately to a section on the line VI—VI of Fig. 7.

It is the usual practice in multiple cylinder pump and motor hydraulic transmissions, to arrange for the hydraulic liquid to circulate in a completely filled closed circuit through the pump and motor. Each pump piston has a pressure stroke, delivering liquid to the motor, while its cylinder is passing through one half of its orbital movement around the cylinder block axis and a suction stroke, recovering liquid from the motor, during the other half of such movement, each motor piston making a corresponding power stroke and exhaust stroke. Thus the transmission has what may be called a thrust side and a return side, and, referring to Fig. 1, similarly the orbital area of the cylinder port openings $o$ in the end face of each cylinder block has a thrust sector T and a return sector R, on either side of a given diameter $x$—$x$.

The thrust sector T and return sector R, of the orbital area of the cylinder ports of each cylinder block, have a constant position irrespective of the absolute and relative rotational speeds of the cylinder blocks. If similar pump and motor cylinder blocks were coaxially opposed with their sectors longitudinally aligned, for thrust at one side and return at the other, and if the ported end faces of the cylinder blocks were brought into direct contact, the sectors would coincide in a common plane.

Fig. 2 shows cylinder port diagrams, of pump and motor cylinder blocks, superposed and thus graphically representing the contacting faces of the cylinder blocks, the pump ports $p$ being shown in thick lines and the motor ports $m$ in thin lines. Although the thrust and return sectors T and R of the two orbital areas of the two rings of ports coincide, it can be seen that if there is any relative rotation of the two cylinder blocks, due to a difference in rotational speed, the ports must pass through a position, such as is shown in Fig. 2, in which a port $p^1$ of one cylinder block, in passing from one sector to the other, simultaneously overlaps by its ends two adjacent ports $m^1$ and $m^2$ of the other cylinder block and which respectively extend into the two different sectors. Thus there is a liquid path through the ports $m^1$, $p^1$ and $m^2$ which short circuits the thrust and return of the hydraulic liquid. Such a leakage would seriously reduce the transmission efficiency and could not be accepted.

Fig. 3 is a diagram similar to Fig. 2 but showing how, by offsetting the axes of the two cylinder blocks by at least the radial dimension of the ports, overlapping of the two sets of ports can be confined entirely to the separate thrust and return sectors T and R. However, such simple offsetting of similar sets of ports cannot give an entirely satisfactory result because, by confining port opening substantially to the middle portion of each sector, as indicated in Fig. 3 by the shaded overlapping of ports, it prevents achievement of the direct linear proportion between pump piston velocity and area of port opening to give the constant liquid velocity through the ports necessary for smooth and efficient working.

One solution to the problem, of obtaining the required progressive and total area of port opening in accordance with pump piston velocity in axially offset pump and motor cylinder blocks, is illustrated by Figs. 4 and 5.

In Fig. 5 is shown in section, on the line V—V of Fig. 4, part of a pump multi-cylinder block 1, with a single ring of cylinder port $p$ of modified profile. The pump cylinder block 1 is opposed in direct contact with a similar motor cylinder block 2 which has cylinder port passages branched to present an outer ring of ports $m^o$ and an inner ring of ports $m^i$, the angular extent of the ports being kept constant.

From Fig. 4 it can be seen that the pump and motor axes are relatively offset but, as compared with the arrangement of Fig. 3, the offsetting has been effected in the direction at right-angles to the meeting line of the thrust and return sectors, $x$—$x$ being the line of the central axial plane of the pump and $x^1$—$x^1$ that of the motor. Consequently, in the thrust sector T the pump ports $p$ open into the outer motor ports $m^o$ whilst in the return sector R they open into the inner motor ports $m^i$. From an inspection of the shaded overlapping areas of the ports it can be appreciated that this arrangement gives progressive port opening and closing substantially co-extensive with but limited to each sector. The coincidence of the ports is partial and symmetrical on either side of full coincidence at the middle of each sector and thus can be achieved the total cumulative area of port opening, including instantaneous maximum opening, required for smooth operation.

In the foregoing description, the invention has been described as applied to closed-circuit apparatus in which the hydraulic liquid is exchanged in both directions between the pump and the motor. Such closed-circuit apparatus has disadvantages including the somewhat complicated arrangement of ports to convey liquid in both directions and the need to provide replenishment valves to keep the liquid circuit full. Such replenishment valves are usually fed from a mass of liquid filling an outer casing containing the pump and motor bodies which consequently run submerged in liquid, the drag of which reduces efficiency.

The present invention lends itself to the design of open-circuit apparatus in which the pump and motor each have a simple ring of ports, no replenishment valves are required and the pump and motor bodies can run "in air" in an outer casing with a consequent saving in drag loss.

The principle of an open-circuit apparatus according to invention is illustrated by Figs. 6 and 7.

Fig. 6 shows a multi-cylinder rotary pump block 3 and a similar motor block 4 with their ends having port members, formed as annular bosses $3^a$ and $4^a$ respectively, opposed in direct contact. As shown by Fig. 7, the pump boss $3^a$ has a single circle of ports $p$ and the motor boss $4^a$ has a larger diameter, single circle of ports $m$. The axes of rotation of the blocks 3 and 4 are relatively offset vertically, as indicated by the central axial plane lines $x$—$x$ and $x^1$—$x^1$ of the pump and motor respectively, so that the ports $p$ and $m$ overlap in one sector of the contact plane of the bosses $3^a$ and $4^a$ for delivery of liquid under pressure from the pump to the motor, as indicated by the arrows T. This overlap of the ports for thrust is shown by vertical shading of the ports in Fig. 7.

The contacting faces of the bosses $3^a$ and $4^a$ form valve surfaces sealing against each other and preventing any transfer of liquid between the ports except where the ports overlap in the thrust sector T. It will be seen however that at the lower side of the contact plane of the bosses $3^a$ and $4^a$, remote from the sector T, the pump ports $p$ open into a central space S, defined and closed by the bosses, and the motor ports $m$ open into the interior C of the casing (not shown) in which the pump and motor are jointly housed.

The space S is maintained supplied with hydraulic liquid, preferably under slight pressure to prevent cavitation, and this is admitted to the pump cylinders in turn as they pass through an intake sector, as indicated by the arrows I and by the oblique shading of ports $p$ in Fig. 7.

The motor ports $m$ exhaust hydraulic liquid into the interior C of the casing as they pass through an exhaust sector as indicated by the arrows E and by the horizontal shading of ports $m$ in Fig. 7.

It can be seen from Fig. 7 that the three areas of port opening, represented as sectors T, I and E respectively in Fig. 7, are always separated by contacting sealing faces of the bosses $3^a$ and $4^a$ and that no port, in passing from the sector T on one hand to the sector I or E on the other, is open simultaneously in two sectors. The phasing of the pistons is of course arranged so that when a port is completely closed, in passing from one sector to another, its piston is passing through a dead-centre in changing direction at one end or the other of its stroke and consequently no liquid is being displaced by such piston.

The exhaust liquid is collected in a casing sump from which it is re-circulated by an auxiliary pump feeding the central space S.

A constructional embodiment of the invention, for open-circuit operation in accordance with Figs. 6 and 7, will now be described with reference to Figs. 8 and 9 which show a hydraulic variable speed and reversing transmission for connection to any suitable uni-directional prime mover.

The whole transmission is contained in a single closed case 5 having a sump 6 which holds a quantity of hydraulic oil amply sufficient to keep the circuit, but not the case 5, full of oil.

At the left-hand side of Fig. 8 is shown a coupling flange 7 by which the rotary output shaft of a prime mover is connected to drive the input shaft 8 of the transmission. Mounted around the input shaft 8, immediately within the case 5, is an auxiliary pump 9, which is shown as an eccentric vane pump but could be of any suitable rotary type. The auxiliary pump 9 draws oil through a duct 10 from the sump 6 and delivers it through ports 11 and an annular space 12 to radial holes 13 in the shaft 8 and thus into the bore 14 of the hollow inner end of the shaft 8.

The inner end of the shaft 8 is flared into a flange 15 the rim of which is bolted to the inner periphery of a multi-cylinder pump block 16 mounted, to rotate with the shaft 8, on a pair of bearings 17 carried by a journal sleeve 18 surrounding the inner end of the shaft 8 and bolted to an internal wall of the case 5.

Each cylinder of the block 16 has a piston 19 with a ball-end 20 bearing in a socket slipper 21 held, with freedom to accommodate itself circumferentially, in a built-up ring 22. The ring 22 is eccentric with respect to the axis of the cylinder block 16 and is mounted, by a pair of ball bearings 23, to rotate in a frame 24 carried by transverse slide bars 25 in the case 5. The frame 24 has a lateral extension 26, see Fig. 9, which carries a nut 27 on a lead screw 28 rotatable by a handwheel 29 for adjustment of the frame 24 on the slides 25 across the case 5 to vary the eccentricity of the ring 22 with respect to the block 16.

When the shaft 8 is driven, the cylinder block 16 rotates therewith and, through the pistons 19 and slippers 21, entrains in its rotation the ring 22. The pistons follow the rotational path of the ring 22 and as this path is eccentric to that of the cylinders in the block 16, the pistons reciprocate in their cylinders with a stroke proportional to the eccentricity of the ring 22 as adjusted by the setting of the frame 24 by the handwheel 29.

Leading axially from the head of each cylinder to the inner end of the block 16 is a port passage 30 opening to a port *p*, equivalent to a port *p* in Figs. 6 and 7, in a port ring 31 carried by a series of circular bosses, one to each cylinder, on the end of the block 16 so as to have a constant angular position on and rotate with the block 16 but free to move axially on the bosses. Behind each port *p*, the inner face of the port ring 31 has a shallow conical recess, in which the respective boss is a sliding fit and the periphery of which is sealed by a resilient packing ring 32.

The pump port ring 31 is opposed in direct face contact with a motor port ring 33, having ports *m*, fast on the inner end of a cylinder block 34 of a multiple cylinder motor essentially identical in construction with the pump and which will therefore be only briefly described.

The motor cylinder block 34 is secured fast to a splined collar 35 on the inner end of an output shaft 36 having a coupling flange 37. The motor pistons 38 are held by slippers in an eccentric ring 39 rotatable in a frame 40 carried by transverse slide bars 41 in the case 5 so that it can be moved, by the hand bell-crank lever 42 and link 43, from side to side of the case 5 to change the eccentricity of the ring 39 from one lateral extreme to the other for forward or reverse rotation.

The rotational axis of the motor block 34 is offset vertically below that of the pump block 16 and the ring of ports *m* in the motor port ring 33 is of greater diameter than the ring of ports *p* in the pump port ring 31. Thus, the arrangement of the ports corresponds to that of Figs. 6 and 7, the paths of the ports overlapping in the upper part of the contact area of the port rings 31 and 33 and being separate in the lower part where the pump ports *p* open to a central space S defined and closed by the rings 31 and 33 and the motor ports *m* open to the interior C of the case 5.

The operation of the transmission is as follows:

On rotation of the shaft 8 by the prime mover, in the direction indicated by the arrow D in Fig. 9, the pump 9 delivers oil from the sump 6 to the bore 14 of the shaft 8, as described earlier in the specification, and maintains the central space S full of oil under a slight pressure. At the same time the pump cylinder block 16 is rotated, causing its pistons 19 to reciprocate, by interaction with the eccentric ring 22. During the lower part of their rotation, the pistons 19 make an outward, induction, stroke taking oil through the port *p* and passages 30 of their respective cylinder from the central space S. During the upper part of their rotation, the pistons 19 make an inward, power, stroke and thrust oil through their respective cylinder passage 30 and port *p* and through the opposed overlapping motor port *m* to displace the respective motor piston 38 outwardly and thus cause rotation of the motor cylinder block 34, by interaction with the eccentric ring 39, and drive the output shaft 36.

As the motor pistons 38 pass through the lower part of their rotation with the block 34, the ports *m* of their respective cylinders open to exhaust oil into the interior C of the case 5 whence it returns by gravity to the sump 6.

The stroke of the pump pistons can be adjusted by the handwheel 29, which could of course be replaced by an automatic control as is known in other hydraulic transmissions, so as to vary the ratio of input shaft speed to output shaft speed and the direction of rotation of the output shaft can be reversed by moving the lever 42.

In general, the operation and use of the present transmission is similar to known, pump and motor combination, hydraulic transmissions but it has an important advantage in efficiency of transmission arising from the port members being in direct contact and obviating the need for a separate valve member. The frictional losses at the contacting port member faces are proportional to only their relative speeds, as compared with the sum of their absolute speeds in the case of port members rotating against stationary valve plates. Thus the frictional loss reduces as the speed ratio between the pump and motor approaches unity and this is of particular advantage in use of the invention as a reduction drive transmission on vehicles because it gives an increasing efficiency with increasing transmitted speed. Further, in unidirectional transmission, the mechanical drag due to friction between the contacting port members is in a direction to augment and not oppose power transmission.

The contacting faces of the port rings 31 and 33 are of course accurately machined to make a face seal one against the other. The axial pressure between these faces is provided initially, when the transmission is starting, by the resilience of the packing rings 32. It will be noted however that the shallow conical recesses in the rear face of the port ring 31 present to the delivery pressure a sealed area additional to the cross-sectional area of the ports *p* and thus the ring 31 is thrust against the ring 33 by, and in proportion to the pressure of, the delivery of oil by the pump.

The transmission is self-lubricating, since all moving parts are exposed either to oil in the pressure circuit or to exhaust oil splashed from the inside of the case 5.

I claim:

1. A hydraulic rotary power transmission apparatus, comprising a rotary pump body, a port member of said pump body and having pump ports, chambers in said pump body in liquid communication with said pump ports, means movable in said chambers for effecting positive displacement of liquid through said pump ports on rotation of said pump body, a rotary motor body, a port member of said motor body having motor ports to receive liquid delivered from said pump ports, chambers in said motor body in liquid communication with said motor ports and means movable in said chambers by liquid received through said motor ports to cause said motor body to rotate, the said port members being directly opposed in mutual contact and the pump ports and motor ports respectively having different rotational paths which overlap in one sector of the mutual contact area of said port members for delivery of liquid from said ports to said motor ports.

2. A hydraulic rotary power transmission apparatus as claimed by claim 1, in which the axes of rotation of the pump body and motor body respectively are relatively offset to give their respective ports different but overlapping rotational paths.

3. A hydraulic rotary power transmission apparatus as claimed by claim 2, the said port members each having a ring of ports and the diameters of the two rings being different so that the paths of the pump ports and motor ports respectively overlap in one sector of the mutual contact area of the port members, for delivery of liquid from pump ports to motor ports, and are radially separate in another sector of said area where the pump ports open for admission of hydraulic liquid and the motor ports open for exhaust of hydraulic liquid.

4. A hydraulic rotary power transmission apparatus as claimed by claim 3, said port members being axially directly opposed in mutual contact, said pump port member being axially displaceable on said pump body and means being provided for urging said pump port member axially relatively to said pump body and towards said motor port member to maintain liquid-sealing contact with said motor port member.

5. A hydraulic rotary power transmission apparatus as claimed by claim 4, said means comprising a surface of said pump port member exposed to the pressure of hydraulic liquid from said chambers in said pump body.

6. A hydraulic rotary power transmission apparatus as claimed by claim 1, said port members being axially directly opposed in mutual contact, said pump port member being axially displaceable on said pump body and means being provided for urging said pump port member axially relatively to said pump body and towards said motor port member to maintain liquid-sealing contact with said motor port member.

7. A hydraulic rotary power transmission apparatus as claimed by claim 6, said means comprising a surface of said pump port member exposed to the pressure of hydraulic liquid from said chambers in said pump body.

8. A hydraulic rotary power transmission apparatus comprising a closed case, an input shaft journalled in one end of said case, a multi-cylinder pump body mounted on said input shaft within said case, a pump piston in each cylinder of said pump body, a ring connected to the outer ends of said pump pistons, eccentrically surrounding said pump body and rotatably mounted in said case, a pump port member having pump ports in liquid communication with the cylinders of and mounted on said pump body for rotation therewith, an output shaft journalled in the other end of said case and having its axis offset transversely from the axis of said input shaft, a multi-cylinder motor body mounted on said output shaft, a piston in each cylinder of said motor body, a ring connected to the outer ends of said motor pistons, eccentrically surrounding said motor body and rotatably mounted in said case, and a motor port member having motor ports in liquid communication with the cylinders of and mounted on said motor body, said pump port member and said motor port member being axially directly opposed in mutual contact.

9. A hydraulic rotary power transmission apparatus as claimed by claim 8, said pump port member and said motor port member each having a single ring of ports and the diameter of said rings being different one from the other.

10. A hydraulic rotary power transmission apparatus as claimed by claim 9, said port members being axially directly opposed in mutual contact, said pump port member being axially displaceable on said pump body and means being provided for urging said pump port member axially relatively to said pump body and towards said motor port member to maintain liquid-sealing contact with said motor port member.

11. A hydraulic rotary power transmission apparatus as claimed by claim 10, said means comprising a surface of said pump port member exposed to the pressure of hydraulic liquid from said chambers in said pump body.

12. A hydraulic rotary power transmission apparatus as claimed by claim 8, said port members being axially directly opposed in mutual contact, said pump port member being axially displaceable on said pump body and means being provided for urging said pump port member axially relatively to said pump body and towards said motor port member to maintain liquid-sealing contact with said motor port member.

13. A hydraulic rotary power transmission apparatus as claimed by claim 12, said means comprising a surface of said pump port member exposed to the pressure of hydraulic liquid from said chambers in said pump body.

References Cited in the file of this patent
UNITED STATES PATENTS

| | | |
|---|---|---|
| 1,044,846 | Barbarou | Nov. 19, 1912 |
| 2,679,139 | Posson | May 25, 1954 |